E. THOMSON.
PRODUCTION OF FINE METAL TUNGSTEN.
APPLICATION FILED FEB. 19, 1908.
960,441.
Patented June 7, 1910.
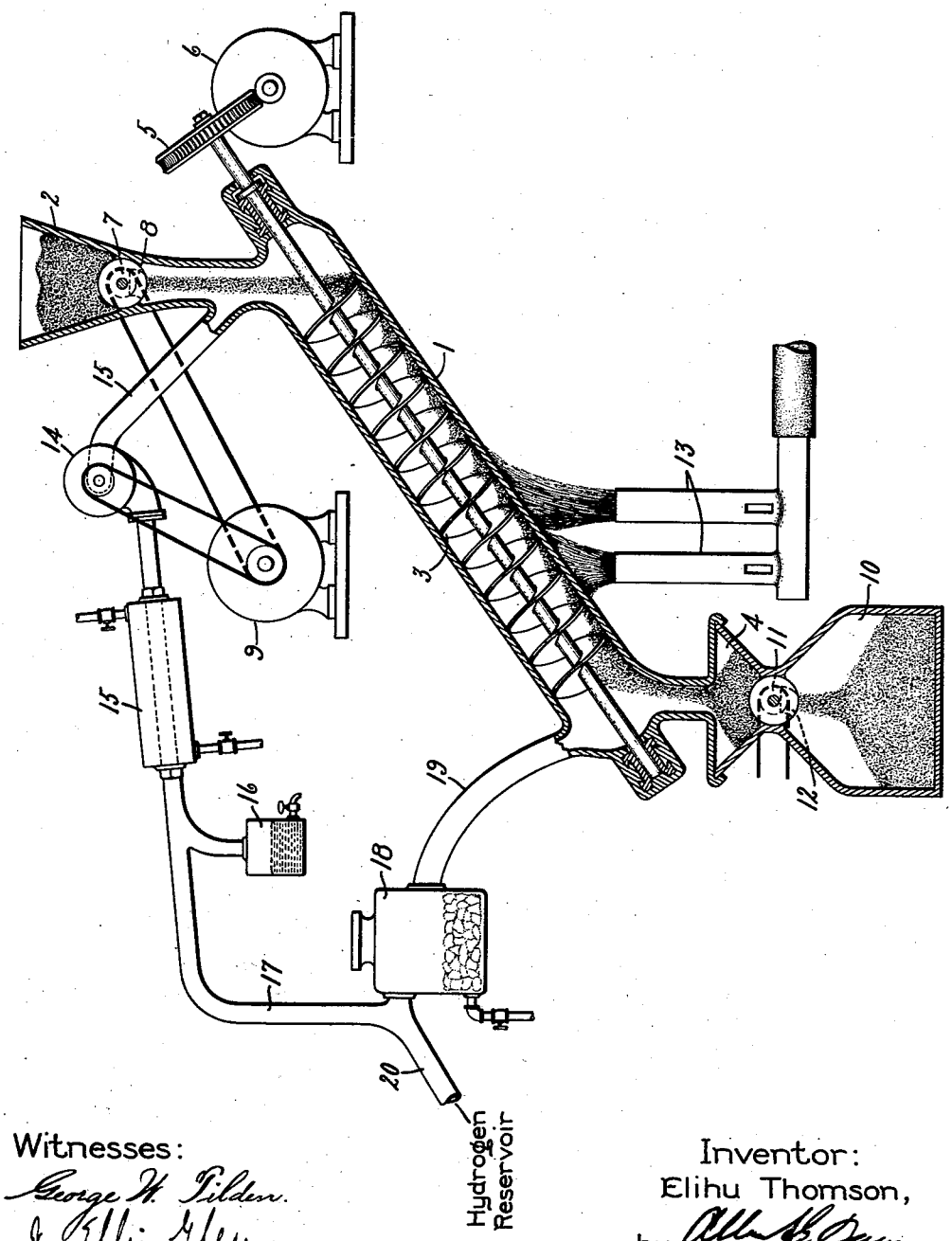
Witnesses:
George H. Tilden.
J. Ellis Glen.
Inventor:
Elihu Thomson,
by Allen B. Davis
Att'y.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

PRODUCTION OF FINE-METAL TUNGSTEN.

960,441.  Specification of Letters Patent.  Patented June 7, 1910.

Application filed February 19, 1908. Serial No. 416,689.

*To all whom it may concern:*

Be it known that I, ELIHU THOMSON, a citizen of the United States, residing at Swampscott, county of Essex, State of Massachusetts, have invented certain new and useful Improvements in the Production of Fine-Metal Tungsten, of which the following is a specification.

My invention relates to the reduction of metals by a gaseous reducing medium.

It is desirable for some purposes to obtain metals in a finely divided state, with the exclusion of all impurities. A very pure, finely divided metal can be best obtained by carefully purifying some reducible compound of the metal, as the oxid, and then effecting a reduction of the finely divided oxid with a pure reducing gas, as hydrogen. As finely divided metals are easily oxidized when heated, great care must be used to guard against the heated reduced metal coming in contact with air, or the watery vapor which results as a by-product in the reaction.

According to my invention I employ a furnace which will accomplish a continuous reduction of metallic compounds, as tungsten oxid, at any desired rate, using for this purpose a reducing gas such as hydrogen. As only a small part of the hydrogen is used up in the reaction when hydrogen gas is passed over a metallic oxid, I provide for the removal of the watery vapor, and return the hydrogen to the furnace to be again used in the reducing process.

The features of novelty of my invention are pointed out with particularity in the claims, but a better understanding of my invention may be obtained from the following description taken in connection with the accompanying drawing.

The reducible tungsten compound, as tungstic oxid, $WO_3$, is conveyed into the tubular-inclined reducing chamber 1 from the hopper 2. The reducing chamber is provided with a rotatable Archimedean screw 3, which serves to move the oxid along the reducing chamber at any desired rate. The reduced metal falls into the receiving hopper 4. The Archimedean screw is rotated at any desired rate, and is connected by means of the gear 5 to any suitable source of power, such as the motor 6. The hydrogen enters at the opposite end of the reducing chamber and passes through the same. The streams of oxid and hydrogen, therefore, move in opposite directions. The reducible oxid is conveyed into the reducing chamber 1 from the hopper 2 by means of the rotatable member 7, which is provided with a slotted portion 8. The rotatable member 7 is connected to any suitable source of power, as the motor 9, and in its revolution the slotted portion 8, in passing through the hopper containing the oxid, "picks up" a portion of oxid and transfers it to the reducing chamber. By this arrangement the oxid is fed uniformly into the furnace and air is kept out of the reduction chamber. The reduced metal is conveyed out of the hopper 4 into a receiving vessel 10, in a similar manner by means of the rotating member 11, which is likewise provided with a slotted portion 12.

The reducing chamber is heated through a portion of its length by any suitable means, such as the gas burners 13. The temperature of this hot zone should be somewhere between 600 to 800° C. As the dry hydrogen gas meets the tungstic oxid in the hot zone, reduction takes place according to the following reaction:

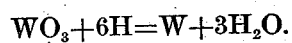
$$WO_3 + 6H = W + 3H_2O.$$

As before stated, the stream of hydrogen and the tungstic oxid move in opposite directions, therefore the watery vapor resulting from the reaction is carried by the hydrogen away from the reduced metal, and re-oxidation is, therefore, avoided. The linear speed of this moving stream of hydrogen must be great enough to carry away the moisture at a rate which will exceed the rate of diffusion of the watery vapor in the opposite direction. The hydrogen, laden with watery vapor, is drawn from the reducing chamber by means of a pump 14 through a tube 15. The pump may be connected to any suitable source of power. As shown on the drawing, it is connected to the motor 9. The hydrogen is conveyed by the pump through a water-cooled condenser 15, where a greater part of the watery vapor is condensed. The condensed moisture trickles down into a receiving vessel 16. The unused hydrogen still containing a certain amount of uncondensed moisture is carried by means of the tube 17 to a vessel 18, where it comes in contact with metallic alkali, such as sodium. The following reaction takes place:

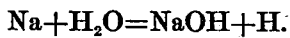
$$Na + H_2O = NaOH + H.$$

As will be seen, the hydrogen is regenerated with the formation of sodium hydroxid. The unused hydrogen, together with this regenerated hydrogen, is carried back to the reducing chamber through a tube 19, and is used again for the purpose of reduction. The vessel 18, instead of containing a metallic alkali for the purpose of regenerating hydrogen from the moisture, may contain a moisture-absorbing agent, such as sulfuric acid or calcium chlorid, and the moisture may thus be absorbed; the unused hydrogen, as before, being returned to the reducing chamber. In either case any losses of hydrogen are made good by the introduction of hydrogen from a hydrogen reservoir through a tube 20.

It is obvious that if desired all of the moisture may be passed over metallic sodium for the purpose of interacting with the same to regenerate hydrogen. In this way the sodium really serves in part as the reducer; the hydrogen merely appearing as an intermediate reducing agent, as some of the hydrogen is alternately oxidized by the oxygen of the tungstic oxid and the watery vapor formed thereby is decomposed by the sodium with the generation of hydrogen.

What I claim as new and desire to secure by Letters Patent of the United States, is,—

1. The process which consists in reducing metallic oxid with hydrogen, recovering at least a part of the hydrogen from the watery vapor formed in the reaction, adding the recovered hydrogen to the main body of hydrogen, and using the combined body of gas to reduce another portion of oxid.

2. The process of continuously reducing metallic compounds, which consists in continuously feeding the compound to and through a zone of treatment, simultaneously passing hydrogen gas through said zone, removing the watery vapor from the unused hydrogen, and returning the hydrogen to the zone of treatment in a continuous cycle.

3. The process of continuously reducing metallic oxid, which consists in continuously feeding the oxid to and through the zone of treatment, simultaneously passing hydrogen gas through the zone, regenerating hydrogen from the watery vapor formed by the reaction, and adding the regenerated hydrogen to the main current of hydrogen in a continuous cycle.

In witness whereof, I have hereunto set my hand this fifteenth day of February, 1908.

ELIHU THOMSON.

Witnesses:
JOHN A. McMANUS, Jr.,
CHARLES A. BARNARD.